United States Patent [19]
Leger et al.

[11] Patent Number: 5,975,450
[45] Date of Patent: *Nov. 2, 1999

[54] TAPE LIBRARY CARTRIDGE MANIPULATION X-Y POSITIONING SYSTEM

[75] Inventors: Gregory S. Leger; Scott R. Patterson, both of Colorado Springs; Ryan S. Porter, Monument, all of Colo.

[73] Assignee: Plasmon LMS, Inc., Colorado Springs, Colo.

[*] Notice: This patent is subject to a terminal disclaimer.

[21] Appl. No.: 08/716,683

[22] Filed: Sep. 16, 1996

[51] Int. Cl.⁶ .................................................. G11B 15/68
[52] U.S. Cl. ............................................................ 242/337
[58] Field of Search .................................. 242/337, 338, 242/338.4; 360/92

[56] References Cited

U.S. PATENT DOCUMENTS

| | | |
|---|---|---|
| 4,452,406 | 6/1984 | Richard . |
| 4,903,252 | 2/1990 | Tanaka et al. ............................ 369/36 |
| 5,274,516 | 12/1993 | Kakuta et al. ........................... 360/92 |
| 5,820,055 | 10/1998 | Leger et al. ............................ 242/337 |

FOREIGN PATENT DOCUMENTS

| | | |
|---|---|---|
| 0379304A2 | 7/1990 | European Pat. Off. . |
| 0708442A2 | 4/1996 | European Pat. Off. . |

*Primary Examiner*—John P. Darling

[57] ABSTRACT

An x-y positioning system having a reduced footprint for use in a tape library mountable in standard electronics racks incorporates a cantilevered x-axis frame movably mounted to a single y-axis rail. A rotation preventer is mounted to one end of the frame for stability. An elevator mounted to the x-axis frame for translation in that axis carries a gripper for cartridge handling. The gripper is aligned with individual cartridges contained in tape library magazines by the x and y motion of the elevator. The gripper mechanism provides pass-through handling of tape cartridges for insertion and removal from tape transport units and storage magazines.

8 Claims, 6 Drawing Sheets

5,975,450

TAPE LIBRARY CARTRIDGE MANIPULATION X-Y POSITIONING SYSTEM

BACKGROUND OF THE INVENTION

1. Field of the Invention

The present invention relates generally to multiple cassette tape storage libraries with random access cartridge handling. More particularly, the invention provides a compact footprint x-y translation mechanism for transport of a cassette handling elevator for movement of cassettes between multiple storage magazines and one or more tape drive units.

2. Description of Related Art

Magnetic tape storage libraries employed for off-line storage of data for archival or short term backup predominantly employ single reel tape cartridges such as the Model 3480 tape cartridge developed by IBM corporation or the Quantum/Digital DLT cartridge. Operation of the IBM 3480 tape cartridge is disclosed in U.S. Pat. No. 4,452,406. The DLT cartridge employs similar functional characteristics in a case having slightly smaller width and length dimensions than the 3480 cartridge. Each cartridge includes a single reel containing a quantity of magnetic tape stored in a substantially rectangular enclosure with an aperture on one major face to receive a rotating capstan for the tape reel. An aperture in one corner of the cartridge allows access to the free end of the tape web by the tape transport unit.

Individual tape transport units are well known in the industry and the development of tape libraries was accomplished to allow automatic retrieval of cartridges for insertion into one or more tape transport units. Initial tape libraries employed vertical arrays of tape cartridges which could be sequentially dropped into a loading position for introduction into an associated tape transport unit. After use, each tape cartridge was then ejected from the tape transport unit and received in a collection area. However, such approaches lacked random access capability. Storage devices employing magazines capable of accepting an array of tape cartridges were developed with vertical movement of the cartridges relative to a stationary tape transport unit employed for positioning selected tape cartridges. These devices typically require significant vertical space to provide magazine actuation travel.

True random access capability has been provided through tape storage libraries employing magazines having vertically stacked cartridges accessible by an elevator retrieval mechanism which transports cartridges to and from the magazine and tape drive unit. Exemplary of this type of storage library is the Philips Laser Magnetic Storage Division (LMS) "Cartridge Stacker Loader" (CSL).

It is desirable to provide multiple magazine capability for increased cartridge storage while maintaining minimal height and footprint for the tape storage library. While tape storage libraries employing multiple access retrieval mechanisms for separate vertical stacks of cartridges are in commercial development. Such devices typically require non-standard footprint sizes due to mechanical operating constraints. It is therefore desirable to provide a multiple magazine tape storage library employing a multiple access retrieval system capable of supplying cartridges to multiple tape transport units on a random access basis while maintaining a footprint suitable for mounting in conventional equipment rack dimensions.

The use of multiple magazines provides additional complexity in inventorying of cartridges stored in the library. It is desirable that cassettes be individually removable from the magazines without magazine removal and that magazines be removable for group handling of cartridges. To obtain configuration control of cartridges stored in the library, it is therefore desirable that the tape library incorporate a separate cartridge insertion and removal port or mailbox to allow automated positioning of cartridges by the tape library system. Additionally, sensing of general access to the magazines and individual magazine removal or replacement or individual cartridge removal or replacement from a magazine is desirable for recovering configuration control when the mailbox is not employed.

Cartridge retaining mechanisms on magazines employed within the tape library must allow access to and removal of the cartridge from the front of the magazine by an operator/user and from the rear of the magazine by the cartridge manipulation mechanism. Pass-through retaining mechanisms such as that employed in the Philips LMS CSL tape storage library have demonstrated satisfactory performance. However, it is desirable to provide the capability for release of the retention mechanism which is self-aligning and can tolerate dimensional variation imposed by operation of the cartridge retrieval mechanism.

SUMMARY OF THE INVENTION

A tape storage library incorporating the present invention employs multiple cartridge magazines, each providing vertically distributed slots for cartridge storage. The magazines are arranged in adjacent, horizontal relation providing an x-y array of cartridges in the tape storage library. The magazines are removably restrained in a frame mounted in a front bay of the tape storage library.

A cartridge retrieval mechanism positioned in an open bay rearwardly adjacent the magazine frames includes an x-axis frame supporting an elevator platform which incorporates a gripper mechanism for retrieval of individual cartridges. The elevator platform translates along the x-axis frame defining a first motion axis.

The x-axis frame is cantilevered from a pillow block assembly which translates along a y-axis rail defining the second axis of motion for the cartridge retrieval assembly. Rotation of the cantilevered x-axis frame about the y-axis rail is restrained by a slotted guide or rolling element mounted proximate one end of the x-axis frame which receives a vertical flange mounted parallel to the y-axis rail.

A gripper for cartridge handling is mounted to the elevator. The gripper is aligned with individual cartridges contained within the magazines by the x and y motion of the elevator and similarly positioned for placement of cartridges in a tape transport unit. A plurality of tape transport units is mounted in a bay rearwardly adjacent the bay containing the x-axis frame. The gripper mechanism provides pass through handling of tape cartridges for insertion and removal from the tape transport units.

An x-y positioning system incorporating the present invention is adapted to carry the elevator and gripper to engage and pass through the cartridges, and includes an x axis frame having a back plate terminating at a first end in a first end plate and at a second end in a second end plate. A pillow block is mounted to the back plate intermediate the first and second ends and a y axis rail is received through the pillow block, extending from the floor of the tape library to a vertical extent proximate a y dimension of an x-y array of cartridge storage locations, providing a centrally cantilevered mounting of the x axis frame. A rotation preventor for the x axis frame is mounted proximate the first end of the back plate. An x axis drive motor is mounted intermediate the pillow block and the second end of the back plate and interconnected to plate mounting a cartridge elevator to the x axis frame for translating motion in the x axis. A y-axis stepper motor and lead screw is provided for translating the pillow block on the y axis rail.

BRIEF DESCRIPTION OF THE DRAWINGS

The present invention is best understood with reference to the following drawings and detailed description wherein.

DETAILED DESCRIPTION OF THE INVENTION

Figure 1:
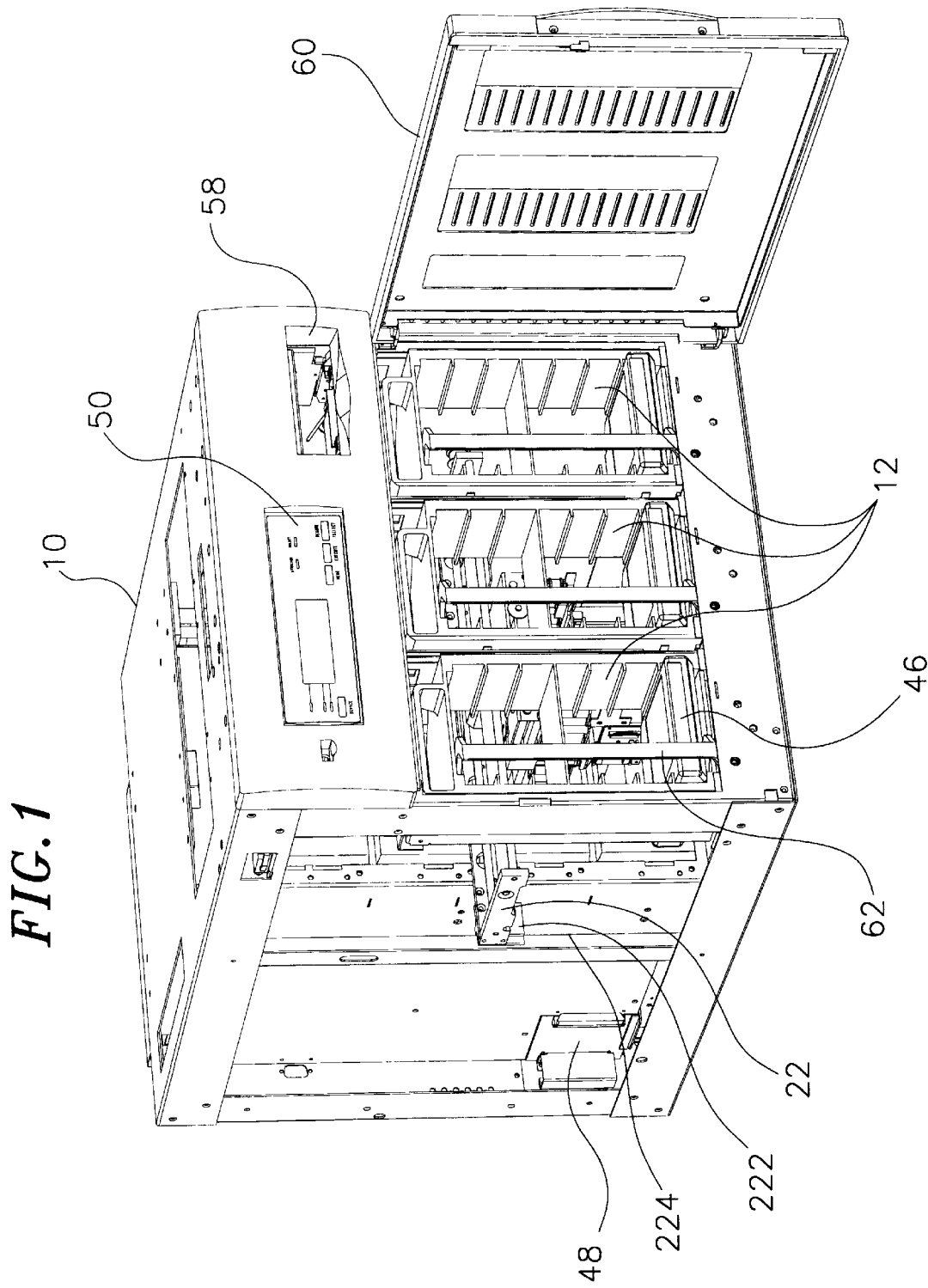
FIG. 1 is a front pictorial view of a tape library incorporating the present invention with the front door and left side panel removed.

Referring to the drawings, FIGS. 1–4 disclose a multi-cartridge tape library incorporating the present invention. The library is housed in an enclosure 10 which, in the embodiment disclosed in the drawings, is suitable for mounting in a conventional 19 inch electronic equipment rack. As best seen in FIG. 1, the present embodiment employs three cartridge magazines 12 which are mounted in frames 14 in a front bay or portion of the enclosure designated 16. A cartridge manipulation unit 18 is mounted in a second bay of the enclosure generally designated 20 immediately rearward of the magazine bay. The cartridge manipulation unit includes an x-y position system which incorporates an x-axis frame 22 and a y-axis rail 24. The x-axis frame is cantilevered from a pillow block assembly 26 carried by the y-axis rail. An elevator assembly 28 is supported by the x-axis frame. Translation of the elevator assembly along the x-axis frame defines a first motion axis for the cartridge manipulation system. Translation of the pillow block assembly on the y-axis rail defines a second axis of motion for the cartridge manipulation system.

Figure 2:
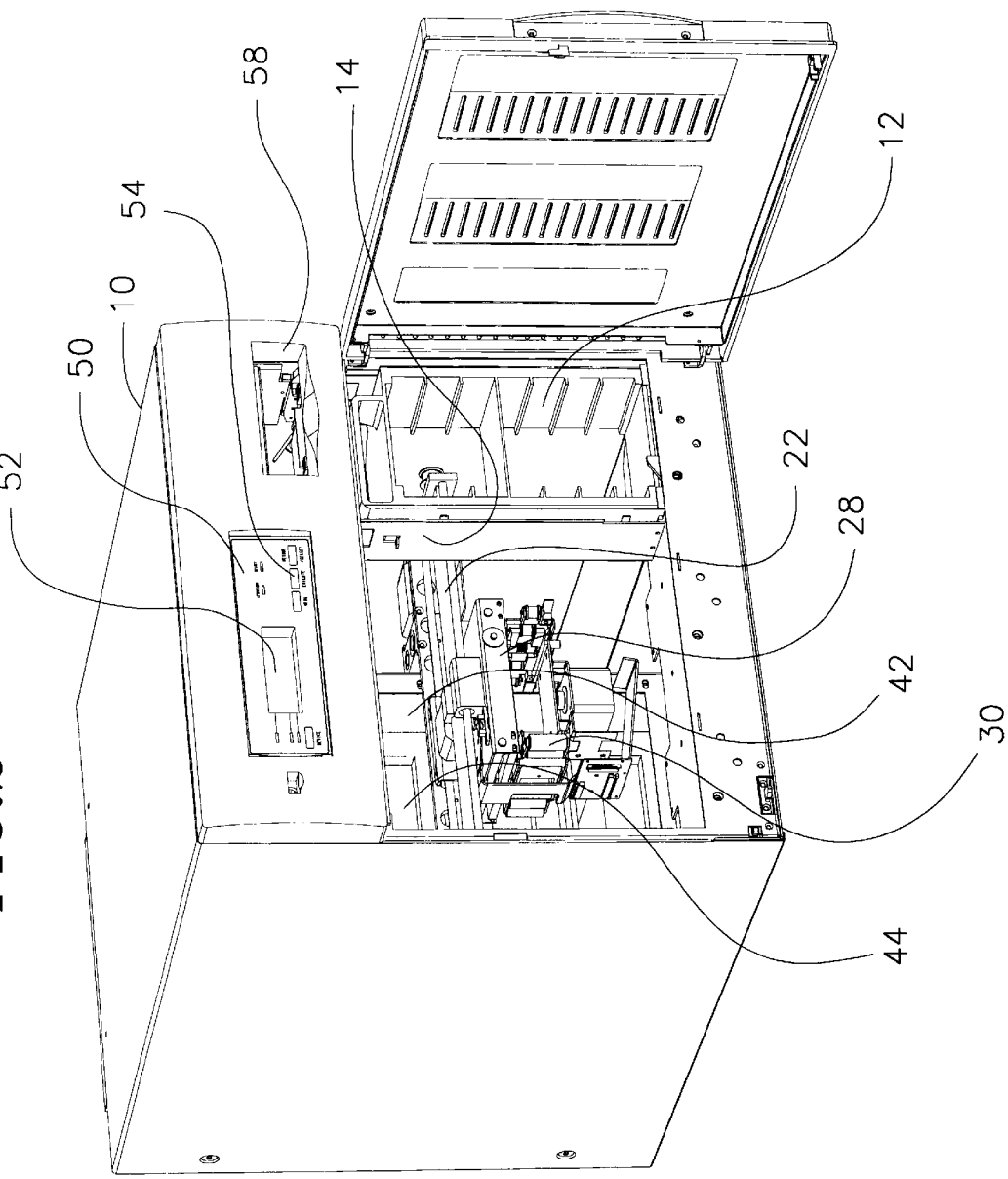
FIG. 2 is a front pictorial view of the tape library of FIG. 1 with two magazines and their associated frames removed to display the cartridge retrieval mechanism.
Figure 6:
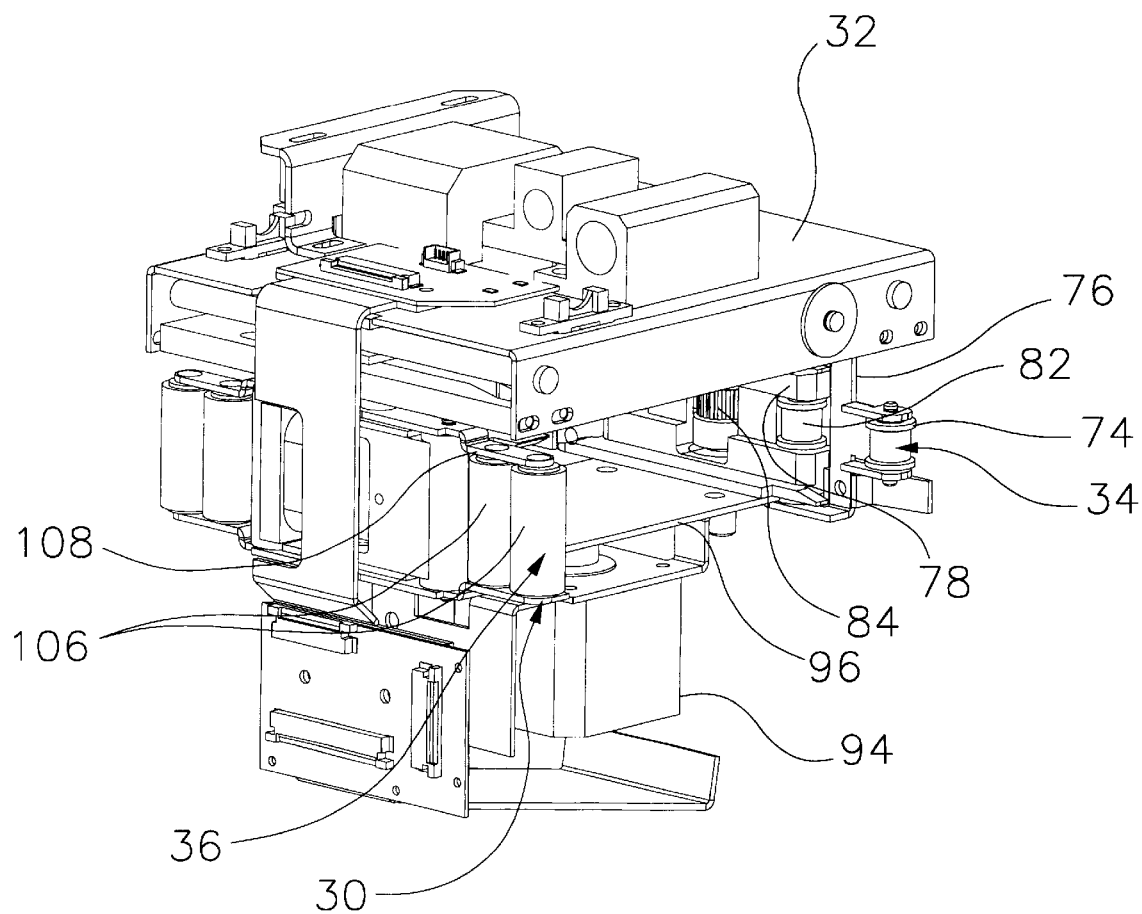
FIG. 6 is a front perspective view of the elevator and gripper assembly.

The elevator assembly incorporates a gripper mechanism 30 for retrieval of individual tape cartridges. The gripper mechanism is movably mounted to an elevator platform 32 and provides a belt drive train 34 which cooperates with opposing roller assembly 36. Details of the elevator assembly are best seen in FIG. 6. The gripper assembly translates on a third motion axis providing +z and −z motion for the cartridge manipulation assembly. Relative position of the elevator assembly in the library is best seen in FIG. 2 which provides a front isometric view of the enclosure with two magazines and their associated mounting frame removed. A tape cartridge 46 shown carried within the gripper assembly.

A third bay in the enclosure generally designated 38 houses four tape drive units 40 for the embodiment shown in the drawings. Each tape drive is integrally mounted in a support chassis received in frame 42 within the enclosure. The cartridge insertion aperture 44 of each tape drive unit is exposed to the cartridge manipulation system operating in the immediately adjacent bay.

An electronics board 48 is mounted in the aft bay of the library enclosure adjacent the tape drive stack in the embodiment shown in the drawings. A central processing unit, memory and electronic control circuitry for the library are mounted on the controller board. Operator interface is accomplished through a control panel 50 mounted on the front face of the enclosure which includes a display 52 for communication with the operator and input keys 54 for manual input by the operator. Communications by the tape library with a user network or other computer devices is accomplished through industry-standard communications interfaces.

Figure 3:
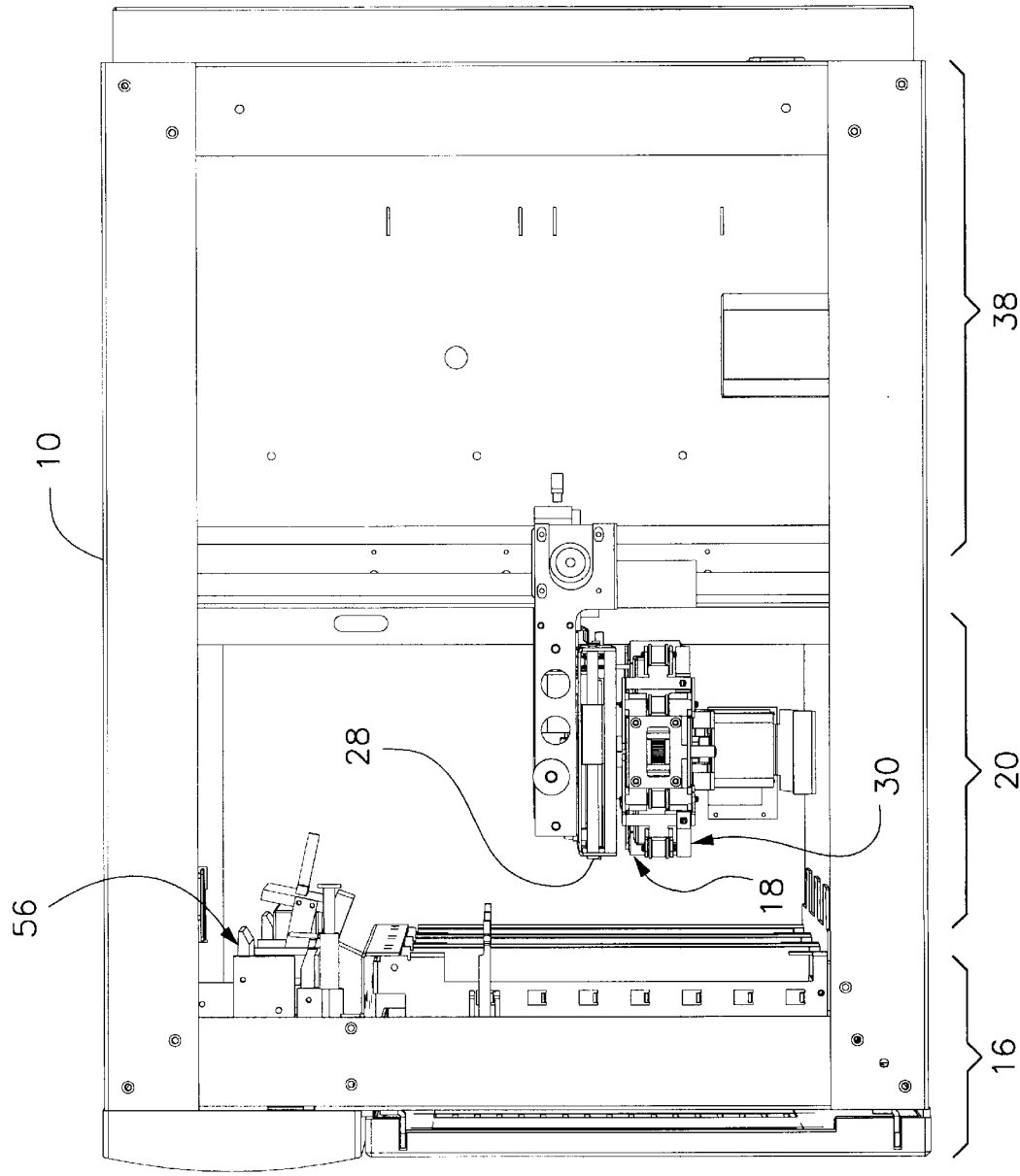
FIG. 3 is a right side pictorial view of the tape library with the side panel removed.

A tape cartridge mailbox assembly 56, seen in FIG. 3, is included in the tape library to allow automated handling of cartridges for individual insertion and removal from the library. The mailbox assembly incorporates a cartridge receiving aperture 58 on the library front face. Cartridges inserted to the mailbox are retrieved by the cartridge manipulation assembly for direct placement in a tape drive assembly or cataloguing in an open magazine slot. Similarly, tape cartridges retrieved by the manipulation assembly from the tape drive or a magazine location are unloaded from the library through the mailbox to be retrieved by an operator.

The tape library as disclosed in the drawings also allows manual cartridge manipulation by an operator through door 60, which exposes the three magazines when opened. The individual magazines are removable from the library, allowing handling of cartridges in seven-unit multiples, and individual cartridges are removable from the magazines directly by rotation of the cartridge stop 62, into an open position, allowing access to individual cartridges stored in the magazine.

A detailed description of the structure and operation of the mailbox assembly, cartridge magazine and cartridge release assemblies is provided in co-pending patent application Ser. No. 08/716,685, attorney docket No. 7004-0098/0099/0101, entitled Tape Library Cartridge Storage and Control System, the disclosure of which is incorporated herein in its entirety by reference.

Figure 5:
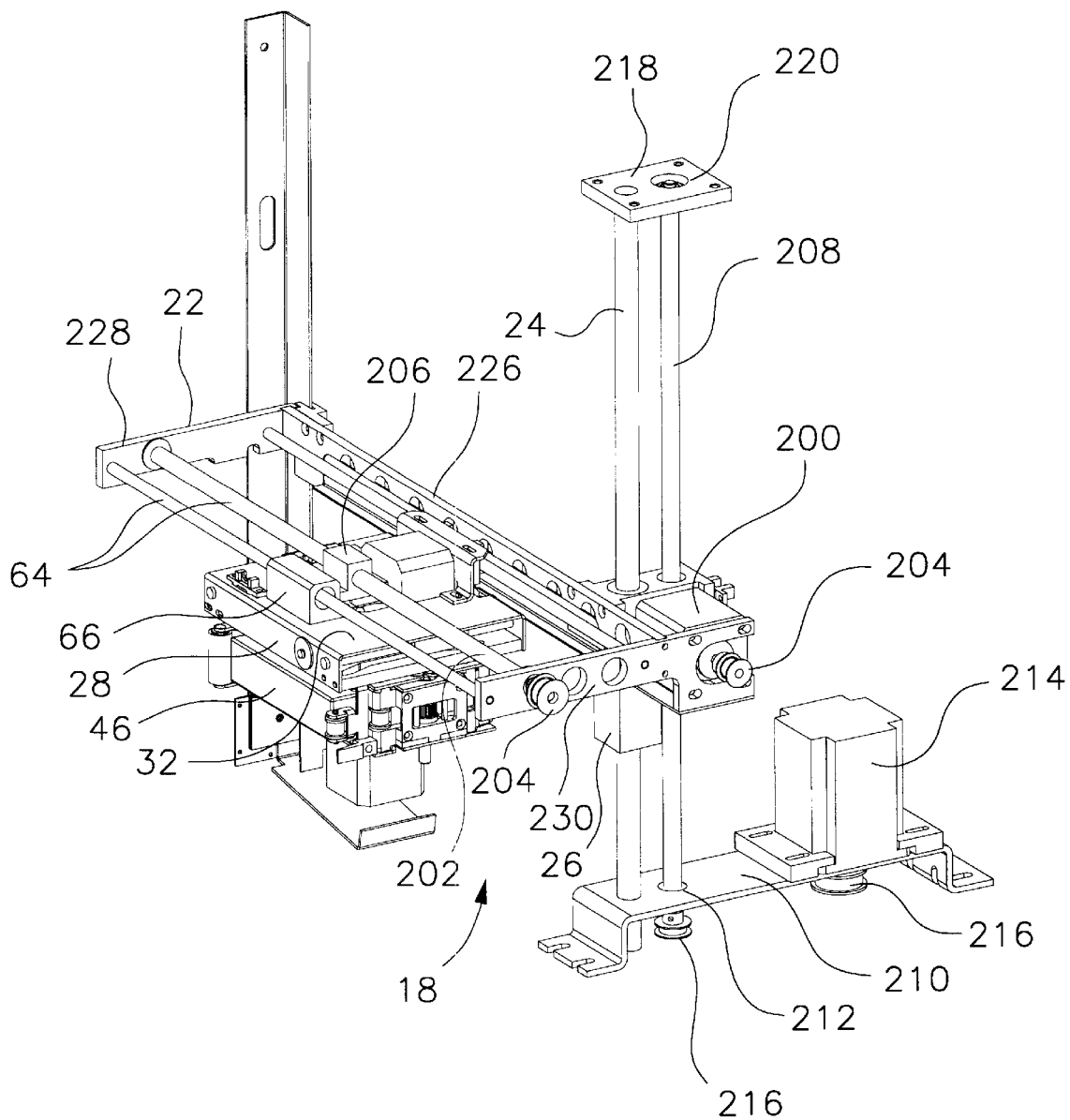
FIG. 5 is a pictorial view of the cartridge retrieval mechanism.

As best seen in FIG. 5, the elevator assembly is carried by the x-axis frame 22, which incorporates two parallel guide rails 64. One rail is traversed by a linear bearing 66 which is mounted to the top of the elevator platform. The entire elevator assembly traverses along the x-axis frame while the x-axis frame is in turn translated along the y-axis rail for positioning of the gripper assembly in an x-y plane for cartridge manipulation alignment.

The gripper, as shown in FIG. 6, is movable bidirectionally relative to the elevator platform in a +z and −z direction, as will be described in greater detail subsequently. A traction assembly having a friction drive belt and cooperating reaction rollers, mounted in spaced relation to receive a cartridge between the belt and rollers, provides the capability to frictionally engage cartridges in the library array and draw them through the gripper. The gripper belt drive train 34 incorporates peripheral rollers 74 which are mounted on pivoting brackets 76. These brackets are in turn mounted to the gripper frame 78 by pivot pins. Inner rollers 82 are mounted coaxially with the pivot pins.

A drive capstan 84 is centrally mounted in the belt drive train, supported by a side cradle. The capstan includes a central drive gear, which engages the gripper belt, and upper and lower bearing mounts carried in the side cradle above and below the drive gear. The capstan shaft extends below the side cradle to engage a pulley belt driven by reversible stepper motor 94, which is mounted to a bottom plate 96 of the gripper frame. Two roll pins are mounted in the side cradle on either side of the capstan, urging the gripper belt onto the drive gear and maintaining belt tension.

An inboard arm on each of the pivot brackets carries a linear cam follower. During translation of the gripper assembly in the ±z-axis directions, the cam followers are controlled by the contour of the race in linear cam block. The outboard cam follower, with respect to the relative ±z-axis motion of the gripper assembly, is driven into a laterally translated portion of the linear cam for the extended portion of the gripper travel. Location of the cam follower opposite the pivot point from the peripheral roller urges the peripheral roller inward for increased pressure on a tape cartridge engaged by the gripper mechanism. Conversely, the inboard cam follower, relative to the direction of motion of the gripper mechanism, remains in the untranslated portion of the cam track. Adjustment of the center of pressure exerted by the gripper belt on a cartridge being manipulated is adjustable at the lateral extents of the ±z-axis gripper motion by contouring of the linear cam track.

The reaction roller assembly 36 cooperates with the belt drive train. As with the belt drive train, cooperating reaction rollers 106 are mounted on pivoting brackets 108. The rollers are carried on an outboard arm of the bracket with respect to a pivot pin while the inboard arm of each of the pivoting brackets carries a cam follower. As previously described for the belt drive train, during translation of the gripper assembly in the ±z-axis directions, a linear cam block controls the cam followers such that the outboard cam follower with respect to the relative ±z-axis motion is driven into laterally translated portions of the cam track. Based on the location of the cam follower opposite the pivot point from the outboard rollers, the pivoting bracket urges the rollers inward, increasing pressure on the tape cartridge in cooperation with the outer roller of the belt drive assembly.

A detailed description of the structure and operation of the elevator and gripper assembly is provided in co-pending patent application Ser. No. 08/716,682, now U.S. Pat. No. 5,752,668, attorney docket No. 7004-0100, entitled Tape Library Cartridge Manipulation Gripper with Z-Axis Translation, the disclosure of which is incorporated herein in its entirety by reference.

In an exemplary operating sequence, the gripper assembly is positioned adjacent a cartridge slot in one of the tape library magazines or the mailbox by the x-y positioning system. The gripper assembly is extended in the +z direction with the drive belt operating in a first direction, as will be described in greater detail subsequently. As the gripper mechanism approaches the extent of its +z motion, the cam followers on the drive belt roller brackets and reaction roller assembly brackets cause the belt and reaction rollers to "pinch" the cartridge which, urged by the drive belt rotated in a forward direction by the stepper motor, is withdrawn from its storage slot into the gripper assembly. The gripper assembly is then withdrawn to a zero position on the z-axis providing even force distribution between both sides of the belt train and roller assembly. The gripper mechanism is then positioned adjacent the cartridge aperture of one of the plurality of tape drives and the gripper assembly translates in the -z direction for affirmative positioning of the cartridge in the tape drive. As the cartridge enters the tape drive, the belt drive is engaged to pass the tape cartridge through the gripper mechanism. As the gripper assembly approaches the extent of its -z travel, the cam followers on the pivoting brackets urge the belt drive roller and outboard rollers into higher pressure contact with the tape cartridge providing affirmative motion control for insertion of the cartridge into the tape drive.

Upon ejection of the tape cartridge from the tape drive, the described manipulation process is reversed, with the belt driven by the stepper motor in a reverse direction, to return the cartridge to its magazine slot or other handling as appropriate. It should be noted that the cartridge manipulation system is available for handling of other cartridges with other tape drives during operation of the first drive.

FIG. 5 displays the features of an x/y positioning system incorporating the present invention. The cantilevered mounting of x-axis frame 22 to y-axis pillow block 26 allows mounting of the x-axis stepper motor 200 substantially within the x-dimension of the frame. X-axis positioning of the elevator assembly is accomplished by the x-axis stepper motor driving lead screw 202 through a drive belt extending between pulleys 204. A lead nut engaging the lead screw is constrained in mounting block 206 which is fixed to the elevator platform 32. Reversible rotation of the lead screw by the x-axis stepper motor positions the elevator assembly at any desired location along the rails 64 in the x-axis frame.

Y-axis pillow block 26 incorporates a bearing receiving y-axis rail 24 and a lead nut engaging y-axis lead screw 208. A unitary support bracket 210 mounted to the floor of the tape library structure, as best seen in FIG. 5, supports the bottom of the y-axis rail and a bottom bearing 212 for the y-axis lead screw. A y-axis stepper motor 214 is mounted to an aft portion of the bracket and drives the y-axis lead screw through belt 216. A top bracket 218 mounted to the top of the library enclosure receives the top of the y-axis rail and houses a top bearing 220 for the y-axis lead screw.

Figure 4:
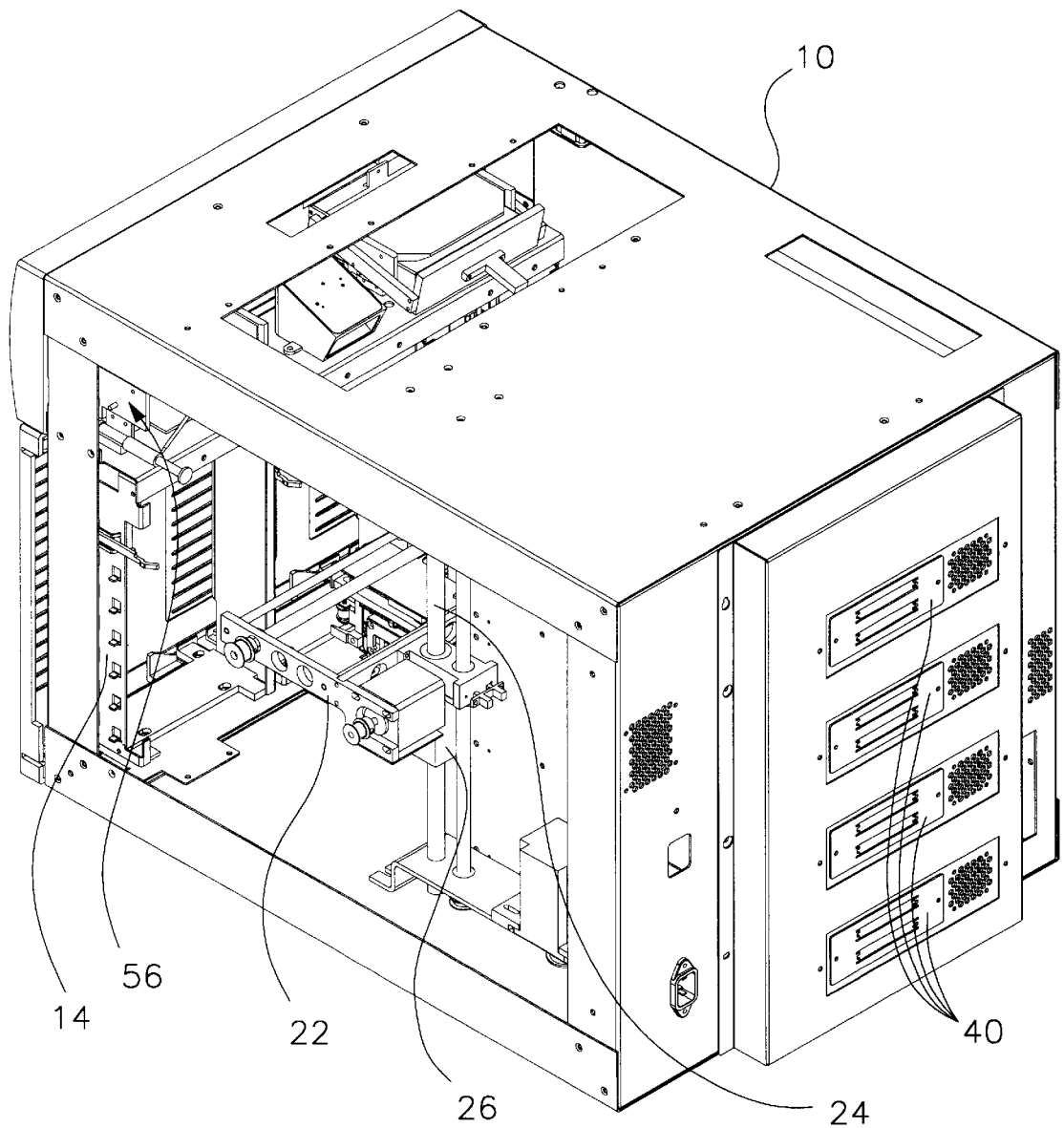
FIG. 4 is a left rear perspective of the tape library with the top and left side panels removed to display elements of the mailbox and cartridge retrieval mechanism.

Rotation of the x-axis frame about the y-axis rail is prevented by slotted glider 222 which is received on vertical flange 224 extending between the floor and top of the library enclosure as best seen in FIG. 1. The slotted glider, or, alternatively, a rolling element, is attached to the back plate 226 of the x-axis frame proximate a first end plate 228 of the x-axis frame. The slotted glider provides for dimensional tolerance relief between the y axis rail and the vertical antirotation flange. The back plate 226 is mounted to pillow block 26. A second end plate 230 completes the x-axis frame with parallel guide rails 64 and x-axis lead screw 202 supported and constrained intermediate the end plates. In the embodiment shown in the drawings, the x-axis stepper motor 200 is mounted intermediate the second end plate of the x-axis frame and the y-axis pillow block. Mounting of the motor inboard of the end plates, with the belt drive train nested against and parallel to one end plate, significantly reduces the x-axis footprint for the x/y positioning system reducing the overall width of the footprint for the tape library. Similarly, centrally cantilevered mounting of the x-axis frame to the y-axis rail through the pillow block allows mounting of the y-axis components in the third bay of the library enclosure adjacent the tape drive mounting frame, as best seen in FIG. 4. The dimensions required for the second bay in which the cartridge manipulation system operates is thereby reduced in both the x and z directions.

The x/y positioning system disclosed, in addition to providing an abbreviated x/z footprint for the manipulation system, provides a substantially unlimited y-axis expansion capability. The y axis rail is extendable to the vertical extent of the y dimension of the cartridge storage array. Stacking of multiple tiers of three magazine frames, such as those disclosed in FIG. 1, allows library expansion while maintaining a reduced width footprint for mounting in conventional electronic racks.

Having now described the invention, as required by the patent statutes, those skilled in the art will recognize modifications and substitutions for the elements of the embodiments disclosed. Such modifications and substitutions are within the scope and intent of the invention as defined in the following claims.

What is claimed is:

1. An apparatus for manipulation of cartridges arranged in an x-y array in a tape library, the apparatus carrying an elevator having a gripper to engage and pass through the cartridges, the apparatus comprising:

an x axis frame having a back plate terminating at a first end in a first end plate and at a second end in a second end plate;

a pillow block mounted to the back plate intermediate the first and second ends;

a y axis rail received through the pillow block and extending from proximate a floor of a tape library to a vertical extent proximate a y dimension of an x-y array of cartridge storage locations, providing a centrally cantilevered mounting of the x axis frame;

means for preventing rotation of the x axis frame mounted proximate the first end of the back plate;

an x axis drive motor mounted intermediate the pillow block and the second end of the back plate;

means for mounting a cartridge elevator to the x axis frame that supports translating motion along the x axis;

means for translating the elevator operably interconnected to the x axis drive motor; and means for translating the pillow block on the y axis rail.

2. An apparatus as defined in claim 1 wherein the means for preventing rotation comprises a slotted glider mounted to the back plate, said glider receiving a vertical flange extending from the floor of the tape library.

3. An apparatus as defined in claim 1 wherein the means for mounting the cartridge elevator comprises:

first and second x-axis guide rails mounted in parallel spaced relation intermediate the first end plate and second end plate;

a linear bearing mounted to the elevator and receiving the first guide rail; and at least one glider mounted to the elevator and slidably contacting the second guide rail tangentially proximate the top of the rail.

4. An apparatus as defined in claim 3 wherein the means for translating the elevator comprises:

a lead screw rotatably mounted intermediate the first end plate and second end plate substantially parallel to the first and second guide rails;

a lead nut mounted to the elevator platform and engaging the lead screw; and a belt drive interconnecting the x-axis drive motor and lead screw, said belt drive oriented proximate and substantially parallel to the second end plate.

5. An apparatus as defined in claim 1 wherein the means for translating of the pillow block comprises a y-axis lead screw mounted proximate and substantially parallel to the y-axis rail;

a lead nut operably engaging the lead screw and constrained within the pillow block; and means for reversibly rotating the y-axis lead screw.

6. An apparatus as defined in claim 5 wherein the means for reversibly rotating the lead screw comprises:

a reversible y-axis stepper motor; and a y-axis belt drive interconnecting the stepper motor and y-axis lead screw.

7. An apparatus as defined in claim 6 wherein the y-axis rail, y-axis lead screw and y-axis stepper motor are substantially aligned perpendicular to the back plate of the x-axis frame.

8. An apparatus as defined in claim 6 further comprising a unitary bracket mounted to the floor, said bracket mounting the y-axis rail and rotatably supporting the y-axis lead screw and wherein the y-axis stepper motor is mounted to said bracket substantially in alignment with the y-axis rail and y-axis lead screw, said alignment substantially perpendicular to the back plate of the x-axis frame.

* * * * *